US008896445B2

(12) United States Patent
Omiya (10) Patent No.: US 8,896,445 B2
(45) Date of Patent: Nov. 25, 2014

(54) ALERT ANALYZING APPARATUS, METHOD AND PROGRAM

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 343 days.

(21) Appl. No.: 13/593,429

(22) Filed: Aug. 23, 2012

(65) Prior Publication Data

US 2013/0057402 A1 Mar. 7, 2013

(30) Foreign Application Priority Data

Sep. 2, 2011 (JP) ................................. 2011-191469

(51) Int. Cl.
- G08B 21/00 (2006.01)
- G06Q 10/06 (2012.01)
- G06Q 10/10 (2012.01)

(52) U.S. Cl.
CPC ............ *G08B 21/00* (2013.01); *G06Q 10/0639* (2013.01); *G06Q 10/109* (2013.01)
USPC .... 340/540; 705/7.11; 705/7.41; 379/265.01; 379/265.06

(58) Field of Classification Search
CPC ...................................................... G08B 21/00
USPC ................ 340/540; 705/1.1, 7.11, 7.12, 7.15, 705/7.25, 7.38, 7.41; 379/265.01–265.03, 379/265.06, 265.1
See application file for complete search history.

(56) References Cited

U.S. PATENT DOCUMENTS

| 6,700,971 | B1 * | 3/2004 | Cohen et al. ............. 379/265.06 |
| 7,076,427 | B2 * | 7/2006 | Scarano et al. ................ 704/270 |
| 7,792,269 | B2 * | 9/2010 | Croak et al. ............. 379/221.11 |
| 8,112,306 | B2 * | 2/2012 | Lyerly et al. .................. 705/7.41 |
| 2001/0032120 | A1 * | 10/2001 | Stuart et al. ...................... 705/11 |

(Continued)

FOREIGN PATENT DOCUMENTS

| JP | H11-134154 | 5/1999 |
| JP | 2003-198736 | 7/2003 |

(Continued)

OTHER PUBLICATIONS

Japan Patent Office, Notification of Reasons for Rejection for Application No. 2011-191469, Mail Date Nov. 27, 2012.

(Continued)

*Primary Examiner* — Eric M Blount
(74) *Attorney, Agent, or Firm* — SoCal IP Law Group LLP; Steven C. Sereboff; John E. Gunther (57) ABSTRACT

An alert analyzing apparatus includes: a storage unit that stores a first value and a preset second value in association with time-of-day information, the first value fluctuating as time elapses; an alert output unit that outputs an alert and time-of-day information in a case in which the first value diverges from the second value in a certain time of day; a comment accepting unit that accepts an input of a comment on the alert thus output, and stores the comment in association with the time-of-day information; and a classification unit that classifies a plurality of time zones into any one of predetermined segments, and stores the comment associated with the time zone thus classified, in association with each of the segments, based on a fluctuation phase of the first value.

9 Claims, 6 Drawing Sheets (56) References Cited

U.S. PATENT DOCUMENTS

| | | | |
|---|---|---|---|
| 2007/0198325 A1* | 8/2007 | Lyerly et al. | 705/10 |
| 2009/0002156 A1* | 1/2009 | Croak et al. | 340/540 |
| 2009/0122973 A1* | 5/2009 | Jay et al. | 379/266.01 |
| 2010/0158237 A1* | 6/2010 | McCormack et al. | 379/265.06 |
| 2012/0256745 A1* | 10/2012 | Piett et al. | 340/540 |

FOREIGN PATENT DOCUMENTS

| | | |
|---|---|---|
| JP | 2003-309656 | 10/2003 |
| JP | 2004-198148 | 7/2004 |
| JP | 2010-134642 | 6/2010 |
| JP | 2011-130238 | 6/2011 |

OTHER PUBLICATIONS

Administrator's Guide of CTstage Lite (for Call Center), OKI Networks Co., Ltd., pp. 1-15.

* cited by examiner

| CAMPAIGN (TASK) | JANUARY | FEBRUARY | MARCH | APRIL | MAY | JUNE | JULY | AUGUST | SEPTEMBER | OCTOBER | NOVEMBER | DECEMBER |
|---|---|---|---|---|---|---|---|---|---|---|---|---|
| CUSTOMER CENTER CREATION UNIT: WEEK | ☐☑☒▮ | | | | | ☐☑☒▮ | | | | | | |
| FOR SEMINARS CREATION UNIT: WEEK | | ☐☑☒▮ | ☐☑☒▮ | ☐☑☒▮ –61 | ☐☑☒▮ –65 | ☐☑☒▮ –62,63 | ☐☑☒▮ –64 | | | | | |
| MULTIPLE TYPES OF CALL-ANSWERING CREATION UNIT: MONTH | | | | | | ☐☑☒▮ | ☐☑☒▮ | | | | | |
| NEW ENROLLMENT CREATION UNIT: WEEK | | | | | | | | | | | | |

[MONTHLY DISPLAY | ANNUAL DISPLAY]

DETERMINED SCHEDULE   UNDETERMINED SCHEDULE   CURRENT MONTH

```
[× CLOSE]
┌──────────────────────────────────────────────────────────────────┐
│ PREVIOUS MONTH         JUNE, 2011              NEXT MONTH        │
│ MONDAY │ TUESDAY │ WEDNESDAY │ THURSDAY │ FRIDAY │ SATURDAY │ SUNDAY │
│        │         │     1     │    2     │   3    │    4     │   5    │
│        │         │  📈 ¥ 👤  │ 📈 ¥ 👤  │📈 ¥ 👤│ 📈 ¥ 👤  │📈 ¥ 👤│
│   6    │    7    │     8     │    9     │  10    │   11     │  12    │
│ 📈 ¥ 👤│ 📈 ¥ 👤 │  📈 ¥ 👤  │ 📈 ¥ 👤  │📈 ¥ 👤│ 📈 ¥ 👤  │📈 ¥ 👤│
│  13    │   14    │    15     │   16     │  17    │   18     │  19    │
│ 📈 ¥ 👤│ 📈 ¥ 👤 │  📈 ¥ 👤  │ 📈 ¥ 👤  │📈 ¥ 👤│ 📈 ¥ 👤  │📈 ¥ 👤│
│  20    │   21    │    22     │   23     │  24    │   25     │  26    │
│ 📈 ¥ 👤│ 📈 ¥ 👤 │  📈 ¥ 👤  │ 📈 ¥ 👤  │📈 ¥ 👤│ 📈 ¥ 👤  │📈 ¥ 👤│
│  27    │   28    │    29     │   30     │        │          │        │
│ 📈 ¥ 👤│ 📈 ¥ 👤 │  📈 ¥ 👤  │ 📈 ¥ 👤  │        │          │        │
└──────────────────────────────────────────────────────────────────┘
[× 閉じる]
```

📈

JUNE 7: TRAFFIC FROM 9:00 TO 10:00 INCREASED BY 20% FROM 1120 PREDICTED CALLS TO 1344 ACTUAL CALLS ～71
JUNE 18: RESPONSE RATE PREDICTED FROM NUMBER OF ASSIGNED STAFF DOES NOT REACH TARGET RESPONSE RATE
     TARGET RESPONSE RATE OF THE DAY: 95%
     RESPONSE RATE PREDICTED FROM NUMBER OF ASSIGNED STAFF: 90%
JUNE 23: TRAFFIC FROM 12:00 TO 15:00 INCREASED BY 15% FROM 1500 PREDICTED CALLS TO 1650 ACTUAL CALLS

¥

JUNE 1: EXPECTED COST JPY265,000 OF THE DAY EXCEEDS TARGET COST JPY170,000 (BALANCE: +JPY95,000)
JUNE 3: EXPECTED COST JPY205,000 OF THE DAY EXCEEDS TARGET COST JPY155,000 (BALANCE: +JPY50,000)
JUNE 7: EXPECTED COST JPY192,000 OF THE DAY EXCEEDS TARGET COST JPY170,000 (BALANCE: +JPY22,000)
JUNE 15: EXPECTED COST JPY202,500 OF THE DAY EXCEEDS TARGET COST JPY170,000 (BALANCE: +JPY32,500)
JUNE 15: EXPECTED COST IN HALF A MONTH EXCEEDS TARGET COST

| | 1 | 2 | 3 | 4 | 5 | 6 | 7 | 8 | 9 | 10 | 11 | 12 | 13 | 14 | 15 | SUM |
|---|---|---|---|---|---|---|---|---|---|---|---|---|---|---|---|---|
| TARGET COST | 170 | 170 | 155 | 145 | 170 | 170 | 170 | 170 | 170 | 155 | 145 | 170 | 170 | 170 | 170 | 2470 |
| EXPECTED COST | 265 | 160 | 205 | 135 | 165 | 169 | 192 | 150 | 165 | 155 | 135 | 165 | 170 | 158 | 202 | 2591 |
| BALANCE | +95 | -10 | +50 | -10 | -5 | -1 | +22 | -20 | -5 | 0 | -10 | -5 | 0 | -12 | +32 | +121 |

(UNIT: JPY1,000)

👤

JUNE 12: NUMBER OF ASSIGNED STAFF IS SMALLER THAN NUMBER OF REQUIRED STAFF BY 50 PERSON-HOURS
       12:00-13:00  13:00-14:00
          -25          -25
JUNE 19: NUMBER OF ASSIGNED STAFF IS SMALLER THAN NUMBER OF REQUIRED STAFF BY 25 PERSON-HOURS
       12:00-13:00  13:00-14:00
          -15          -10

ALERT ANALYZING APPARATUS, METHOD AND PROGRAM

This application is based on and claims the benefit of priority from Japanese Patent Application No. 2011-191469, filed on 2 Sep. 2011, the content of which is incorporated herein by reference.

BACKGROUND OF THE INVENTION

1. Field of the Invention

The present invention relates to an apparatus, a method and a program, all of which analyze an alert in a case in which an actual value diverges from a predicted value.

2. Related Art

Conventionally, various computer systems are provided with a function of outputting an alert for warning about abnormality of certain monitoring data, in a case in which an actual value of the monitoring data diverges from a normal value or a predicted value.

For example, Japanese Unexamined Patent Application, Publication No. 2011-130238 (Patent Document 1) discloses a method that is capable of storing analytical information associated with alert information, and retrieving related alert information.

SUMMARY OF THE INVENTION

Information added to the alert information such as the analytical information disclosed in Patent Document 1 is information extracted from a monitoring object when detecting the alert. Therefore, based on the alert information and the added information, a manager judges a cause of abnormality when the alert was output, or a countermeasure against the alert, or the like.

However, generally, since the manager analyzes a cause of, and provides a countermeasure against, an individual alert, it has been difficult to utilize the manager's know-how in the past for coping with other alerts and improving the accuracy of predicting a condition that would occur in the future. More specifically, in conventional alert analyzing apparatuses, when the accuracy of prediction in the future is improved by referring to alerts in the past, there has not been disclosed a technique for outputting information of causal analyses and countermeasures provided by a manager and the like, for an alert that should be referred to. Furthermore, even in a case in which causal analyses and countermeasures are provided by a manager and the like for individual alerts, there has not been disclosed a technique for outputting information of causal analyses and countermeasures provided by the manager and the like for other alerts having common characteristics serving as helpful information.

An object of the present invention is to provide an alert analyzing apparatus, an alert analyzing method, and an alert analyzing program, all of which can efficiently provide the manager's know-how regarding individual alerts, for later analyses.

According to the present invention, means as follows is provided for solving the problems.

A first aspect of the present invention is an alert analyzing apparatus including: a storage unit that stores a first value and a preset second value in association with time-of-day information, the first value fluctuating as time elapses; an alert output unit that outputs an alert and time-of-day information in a case in which the first value diverges from the second value in a certain time of day; a comment accepting unit that accepts an input of a comment on the alert that is output from the alert output unit, and stores the comment in association with the time-of-day information; and a classification unit that classifies a plurality of time zones into any one of predetermined segments, and stores the comment associated with the time zone thus classified, in association with each of the segments, based on a fluctuation phase of the first value.

According to such a configuration, the alert analyzing apparatus can accept a comment on each of the alerts, and classify the comment thus accepted, based on each fluctuation phase of the first value being an actual value. Therefore, since the alert analyzing apparatus can output comments classified into each segment in response to a request from the user, the manager's know-how that was input as comments on individual alerts can be efficiently provided for later analyses.

A second aspect of the present invention is the alert analyzing apparatus as recited in the first aspect, in which the first value and the second value include at least any one of traffic, a number of operators, or cost, at a contact center.

According to such a configuration, the alert analyzing apparatus can provide a comment that is input for an alert for traffic, staff or cost, based on divergence between the predicted value and the actual value, the comment being classified into each fluctuation phase of the actual value. Therefore, the user of the alert analyzing apparatus can efficiently refer to such comments at a contact center, and utilize the comments for improving the accuracy of the predicted value in a similar phase, and analyzing a cause of, or providing a countermeasure against, an alert in a similar phase.

A third aspect of the present invention is the alert analyzing apparatus as recited in the first or second aspect, in which the comment accepting unit accepts an input of a comment including a cause of, or a countermeasure against, divergence between the first value and the second value.

According to such a configuration, since the alert analyzing apparatus accepts a comment including a cause of, or a countermeasure against, an alert, the manager's know-how can be utilized for improving the accuracy of the predicted value in a similar phase, and analyzing a cause of, or providing a countermeasure against, divergence between the predicted value and the actual value in a similar phase.

A fourth aspect of the present invention is the alert analyzing apparatus as recited in any one of the first to third aspects, further including: a graphic chart display unit that displays a graphic chart showing how the first value fluctuates as time elapses; and an alert display unit that displays the alert and the comment in association with the graphic chart.

According to such a configuration, the alert analyzing apparatus displays fluctuation of the first value that is the actual value as a graphic chart, and displays the alert and the comment in association with the graphic chart. Therefore, the user of the alert analyzing apparatus can efficiently refer to and utilize the alert and the comment corresponding to each fluctuation phase of the actual value.

A fifth aspect of the present invention is the alert analyzing apparatus as recited in the fourth aspect, in which the alert display unit determines a manner of displaying the alert and the comment, in accordance with an amount of divergence between the first value and the second value.

According to such a configuration, the alert analyzing apparatus determines a manner of displaying the alert and the comment in accordance with an amount of divergence between the predicted value and the actual value, and therefore can indicate importance of the alert by, for example, changing an icon color or a display font for the alert.

A sixth aspect of the present invention is the alert analyzing apparatus as recited in any one of the first to fifth aspects, in which the segments include at least a rising trend phase, a sharply rising phase, a falling trend phase, and a sharply falling phase.

According to such a configuration, based on characteristics of fluctuation of the first value, the alert analyzing apparatus can classify the corresponding alerts and comments through classification of the time zones into: the rising trend phase in which the first value rises gently; the sharply rising phase in which the first value rises sharply; the falling trend phase in which the first value falls gently; and the sharply falling phase in which the first value falls sharply.

A seventh aspect of the present invention is the alert analyzing apparatus as recited in any one of the first to sixth aspects, in which the classification unit determines a segment to classify the time zones into, based on an amount of fluctuation of the first value per elapsed time period.

According to such a configuration, the alert analyzing apparatus classifies time zones by segmenting characteristics of fluctuation, based on an amount of fluctuation of the first value per elapsed time period, and therefore can classify and provide alerts and comments automatically not manually.

An eighth aspect of the present invention is an alert analyzing method, causing a computer to execute: a storing step of storing a first value and a preset second value in association with time-of-day information, the first value fluctuating as time elapses; an alert outputting step of outputting an alert and time-of-day information in a case in which the first value diverges from the second value in a certain time of day; a comment accepting step of accepting an input of a comment on the alert that is output in the alert outputting step, and storing the comment in association with the time-of-day information; and a classifying step of classifying a plurality of time zones into any one of predetermined segments, and storing the comment associated with the time zone thus classified, in association with each of the segments, based on a fluctuation phase of the first value.

According to such a configuration, effects similar to those of the first aspect can be expected by causing the computer to execute the alert analyzing method.

An ninth aspect of the present invention is an alert analyzing program for causing a computer to execute: a storing step of storing a first value and a preset second value in association with time-of-day information, the first value fluctuating as time elapses; an alert outputting step of outputting an alert and time-of-day information in a case in which the first value diverges from the second value in a certain time of day; a comment accepting step of accepting an input of a comment on the alert that is output in the alert outputting step, and storing the comment in association with the time-of-day information; and a classifying step of classifying a plurality of time zones into any one of predetermined segments, and storing the comment associated with the time zone thus classified, in association with each of the segments, based on a fluctuation phase of the first value.

According to such a configuration, effects similar to those of the first aspect can be expected by causing the computer to execute the alert analyzing program.

According to the present invention, the manager's know-how regarding individual alerts can be efficiently provided for later analyses.

DETAILED DESCRIPTION OF THE INVENTION

Descriptions are hereinafter provided for an example of an embodiment of the present invention.

An alert analyzing apparatus 1 according to the present embodiment is an apparatus that accumulates auxiliary data for analyzing an alert later, such an alert is output in a case in which an actually monitored first value (for example, an actual value) diverges from (i.e. is larger or smaller by a predetermined level than) a preset second value (for example, a predicted value or a target value), and such values represent monitoring data such as traffic, a number of operators, or cost, at a contact center.

Here, the alert is output in cases such as, for example, a case in which the actual value (the first value) is increased or decreased by more than a predetermined level from the predicted value (the second value) of the traffic, a case in which the expected cost (the first value) exceeds the target cost (the second value), or a case in which the number of assigned staff (the first value) is smaller than the number of required staff (the second value).

Figure 1:
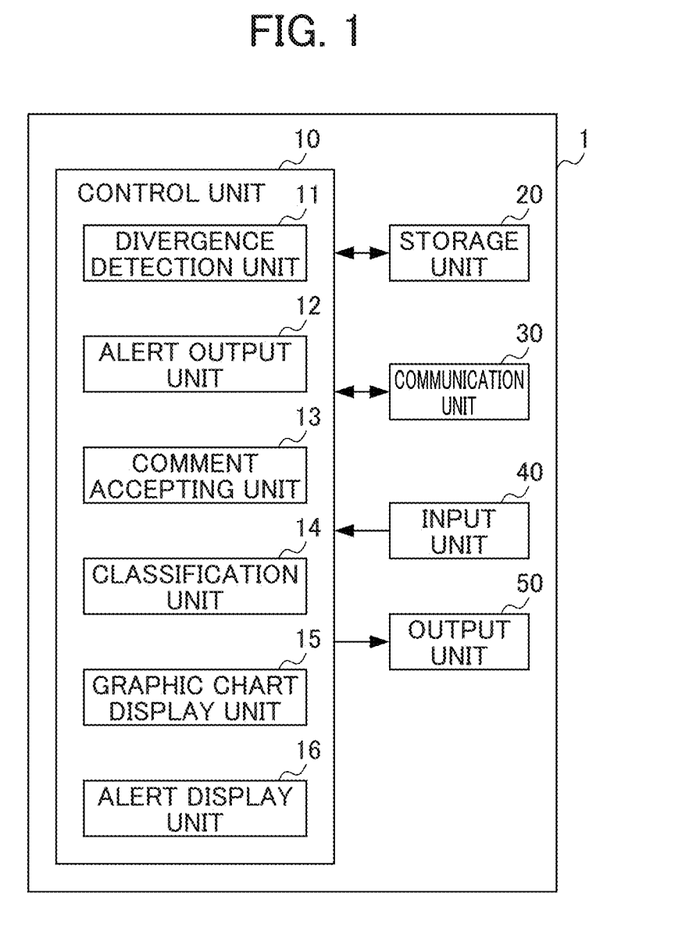
FIG. 1 is a block diagram showing a functional configuration of an alert analyzing apparatus according to an embodiment of the present invention.

FIG. 1 is a block diagram showing a functional configuration of the alert analyzing apparatus 1 according to the present embodiment.

The alert analyzing apparatus 1 includes a control unit 10, a storage unit 20, a communication unit 30, an input unit 40, and an output unit 50.

The control unit 10 controls the entirety of the alert analyzing apparatus 1, and appropriately reads and executes various programs stored in the storage unit 20, thereby collaborating with the aforementioned hardware units, and implementing various functions according to the present embodiment. The control unit 10 may be a central processing unit (CPU). Functions of each part provided to the control unit 10 will be described later.

The storage unit 20 is a storage area that stores various programs and a variety of data for causing a group of hardware units to function as the alert analyzing apparatus 1, in which the storage unit 20 may be a hard disk drive (HDD). More specifically, the storage unit 20 stores a program (an alert analyzing program) that is executed by the control unit 10 to implement various functions of the present embodiment.

The storage unit 20 stores the first value and the preset second value in association with time-of-day information, the first value fluctuating as the time elapses. The storage unit 20 further stores alert information and a comment corresponding thereto, which will be described later.

The communication unit 30 is a network adapter used by the alert analyzing apparatus 1 to transmit and receive data to and from other apparatuses. The communication unit 30 acquires the first value, such as various actual values, from a PBX or CTI server through a network, and provides the first value to the control unit 10.

The input unit 40 is an interface device that accepts an input of an instruction by a user into the alert analyzing apparatus 1. The input unit 40 is configured by, for example, a keyboard, a mouse, a touch screen, and the like.

The output unit 50 includes a display unit that displays a screen for accepting an input of data from the user, and displays a screen for showing results of processing by the alert analyzing apparatus 1. The output unit 50 may also include a display unit such as a cathode ray tube (CRT) display or a liquid crystal display (LCD), as well as other various output units such as a printer.

Next, detailed descriptions are provided for functions of the control unit 10.

The control unit 10 includes a divergence detection unit 11, an alert output unit 12, a comment accepting unit 13, a classification unit 14, a graphic chart display unit 15, and an alert display unit 16. Each of those units is a functional block that is implemented by executing the alert analyzing program.

The divergence detection unit 11 compares the first value with the second value regarding predetermined monitoring data, thereby detecting divergence that exceeds preset difference therebetween.

In a case in which the divergence detection unit 11 detects divergence between the first value and the second value in a certain time of day, the alert output unit 12 outputs alert information together with information indicating the time of day. The alert information is stored into the storage unit 20, and is output by the output unit 50 immediately or at predetermined timing, or in response to a request from the user.

For each of the alert information that is output by the alert output unit 12, the comment accepting unit 13 accepts an input of a comment including a cause of, or a countermeasure against, the divergence between the first value and the second value, and stores the comment into the storage unit 20 in association with the time-of-day information.

Based on a fluctuation phase of the first value, the classification unit 14 classifies a plurality of time zones into any one of predetermined segments, and stores a comment associated with the time zone thus classified, in association with each of the segments.

Here, segments include at least a rising trend phase, a sharply rising phase, a falling trend phase, and a sharply falling phase, and the classification unit 14 determines a segment to classify time zones into, based on an amount of fluctuation of the first value per elapsed time period.

The graphic chart display unit 15 displays a graphic chart showing how the first value fluctuates as the time elapses. In addition to the first value, the graphic chart display unit 15 may also display how the second value fluctuates as compared with the first value.

The alert display unit 16 displays an alert and a comment in association with a graphic chart. At this time, the alert display unit 16 determines a manner of displaying the alert and the comment, in accordance with an amount of divergence between the first value and the second value. More specifically, for example, the alert display unit 16 reports importance of the alert by changing a display color in accordance with an amount of divergence.

Figure 2:
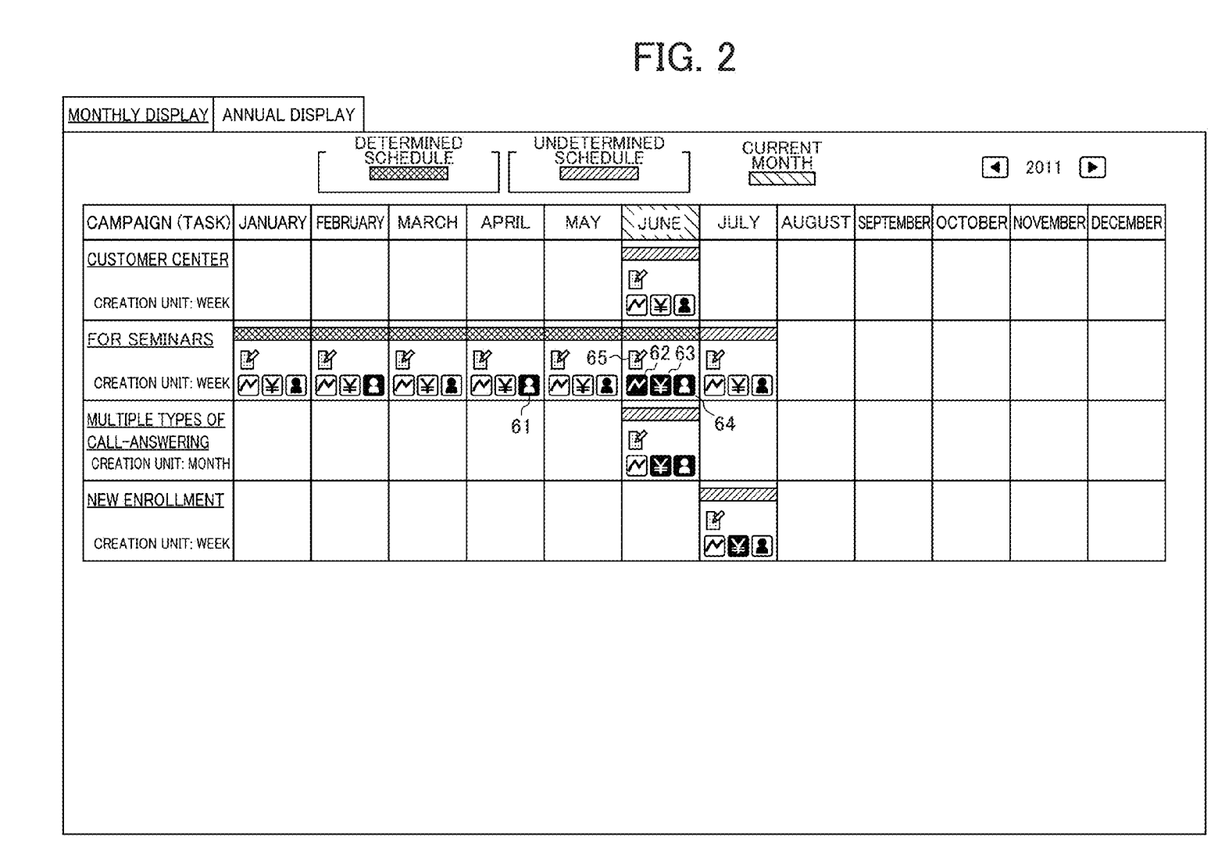
FIG. 2 is a diagram showing an example of an annual display screen of alerts according to the embodiment of the present invention.

FIG. 2 is a diagram showing an example of an annual display screen of alerts that are output in the alert analyzing apparatus 1 according to the present embodiment.

In the present example, presence or absence of alerts for traffic, cost and staff is displayed so as to be distinguished by icon colors, together with the determined status of schedules, for each campaign (task) on a monthly basis. For example, with regard to the schedule for seminars, there is an alert (61) for staff in April; there is no alert in May; and there are alerts (62, 63 and 64) of all three types in June.

Based on importance of an alert in accordance with an amount of divergence, a manner of displaying an icon, such as a color or a shape thereof, may be selected from a plurality of options. When an icon 65 is clicked, details of alerts for seminars in June are displayed.

Figure 3:
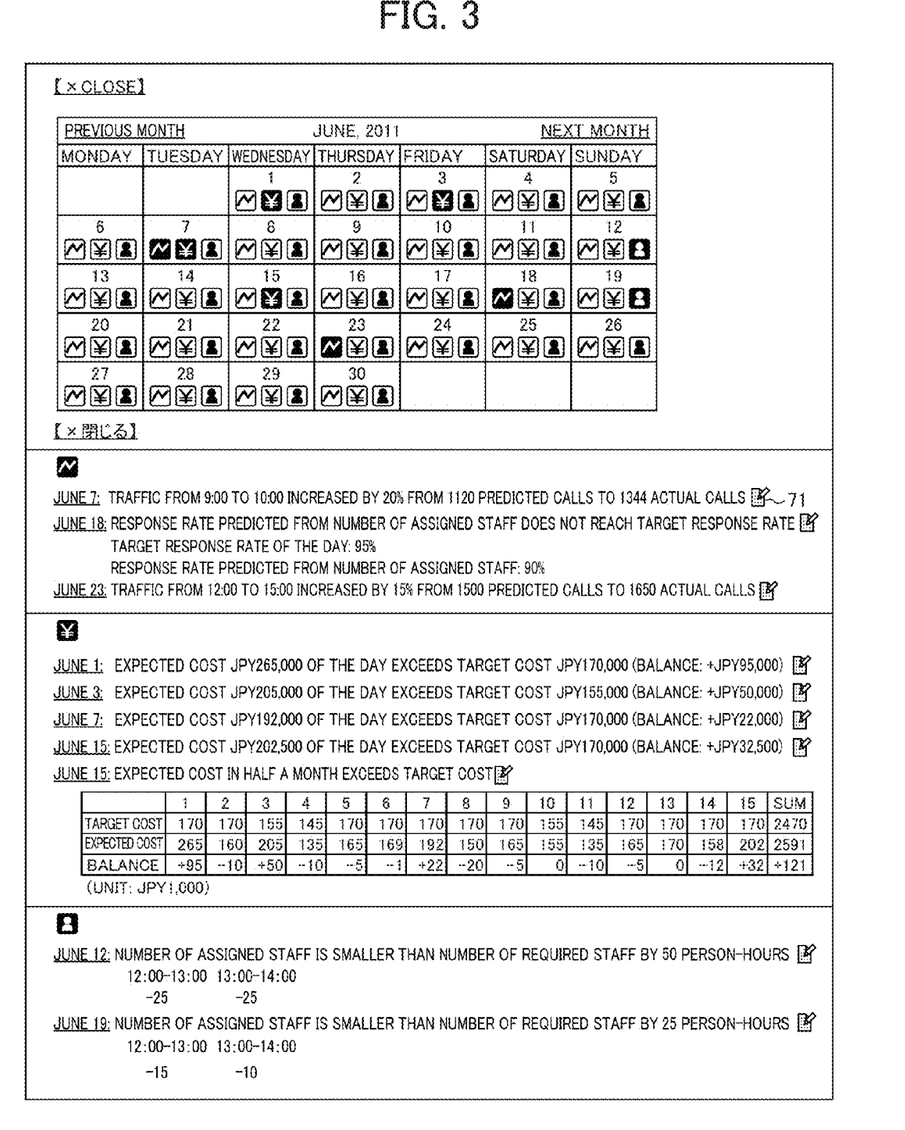
FIG. 3 is a diagram showing an example of a detailed display screen of alerts according to the embodiment of the present invention.

FIG. 3 is a diagram showing an example of a detailed display screen of alerts that are output in the alert analyzing apparatus 1 according to the present embodiment.

In the present example, similarly to the screen example shown in FIG. 2, presence or absence of alerts for seminars in June is displayed so as to be distinguished by icon colors, on a daily basis on the calendar.

Details of alerts for traffic, cost and staff are listed on a daily basis.

For example, alerts for traffic are output such that the actual traffic (the first value) is increased from the predicted traffic (the second value), the response rate (the first value) predicted from the number of assigned staff is lower than the target response rate (the second value), and the like.

Alerts for cost are output such that the expected cost (the first value) exceeds the target cost (the second value) on a daily basis, the total amount of the expected cost (the first value) exceeds the total amount of the target cost (the second value) on a bimonthly basis, and the like.

Alerts for staff are output such that the number of assigned staff (the first value) is smaller than the number of required staff (the second value), and the like.

An icon 71 for inputting a comment is disposed beside each alert, and when the icon 71 is clicked, the alert analyzing apparatus 1 accepts an input of a comment from the user.

Figure 4:
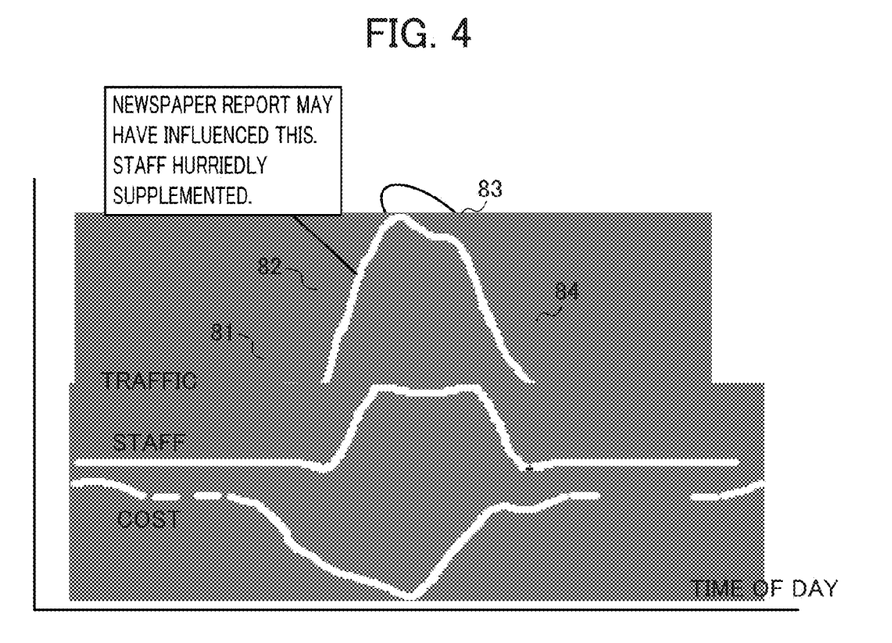
FIG. 4 is a diagram showing an example of a display screen of a graphic chart and an alert regarding first values according to the embodiment of the present invention.

FIG. 4 is a diagram showing an example of a display screen of a graphic chart and an alert regarding the first values that are output in the alert analyzing apparatus 1 according to the present embodiment.

In the present example, the first values of traffic, staff and cost are graphed in relation to the elapsed time period. In accordance with the amount of fluctuation, the first values are segmented into: a rising trend phase 81, a sharply rising phase 82, a falling trend phase 83, and sharply falling phase 84, in which a comment thus input is associated with each segment.

When the user selects a point in the graphic chart of the first values by clicking or the like, a comment corresponding to the point is displayed. A point (time of day) of occurrence of an alert may be indicated by displaying an icon superimposed with the point in the graphic chart, changing a type of line or a color of the point in the graphic chart, or doing the like.

Figure 5:
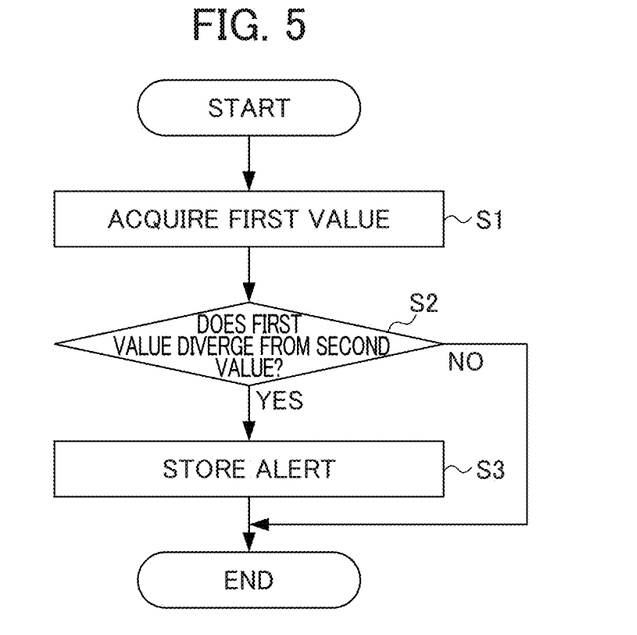
FIG. 5 is a flowchart showing alert output processing according to the embodiment of the present invention.

FIG. 5 is a flowchart showing alert output processing in the alert analyzing apparatus 1 according to the present embodiment.

The present processing is executed each time the first value corresponding to the second value is acquired. It is assumed that the second value is preset and stored in the storage unit 20.

In Step S1, the control unit 10 acquires the first value of traffic, cost and staff, and stores the first value into the storage unit 20 in association with time-of-day information.

In Step S2, the control unit 10 (the divergence detection unit 11) compares the first value stored in Step S1 with the second value corresponding thereto, and determines whether there is divergence of more than a predetermined level. In a case in which the determination is YES, the processing advances to Step S3, and in a case in which the determination is NO, the processing is terminated.

In Step S3, the control unit 10 (the alert output unit 12) stores information of the divergence determined in Step S2 as an alert into the storage unit 20, in association with the time-of-day information.

Figure 6:
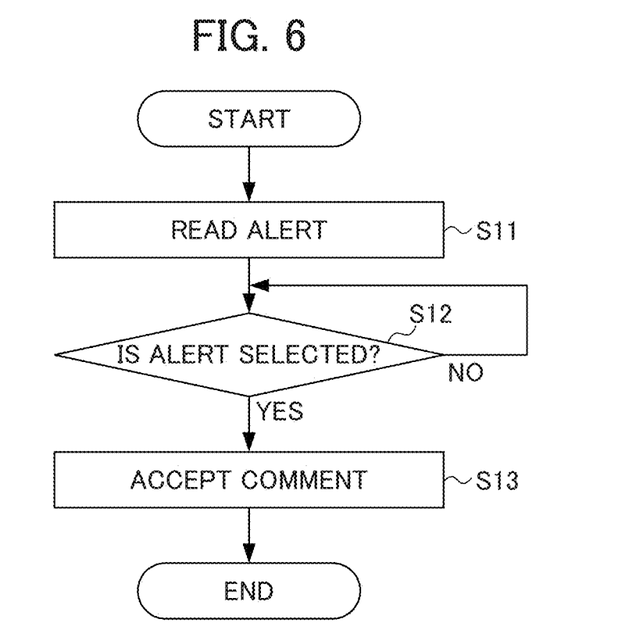
FIG. 6 is a flowchart showing comment accepting processing according to the embodiment of the present invention.

FIG. 6 is a flowchart showing comment accepting processing in the alert analyzing apparatus 1 according to the present embodiment.

The present processing is executed when an alert is displayed.

In Step S11, the control unit 10 reads the alerts stored in the alert output processing (FIG. 5), and displays a list of the alerts (for example, FIG. 3) via the output unit 50.

In Step S12, the control unit 10 determines whether selection (clicking) of an icon for inputting a comment by the user is accepted, from the list of the alerts displayed in Step S11. In a case in which the determination is YES, the processing advances to Step S13, and in a case in which the determination is NO, the processing returns to Step S12 and waits for an input of selection.

In Step S13, the control unit 10 (the comment accepting unit 13) accepts an input of a comment including information of a cause of, or a countermeasure against, the alert selected in Step S12. The control unit 10 stores the comment thus accepted into the storage unit 20, in association with the time-of-day information of occurrence of the alert.

Figure 7:
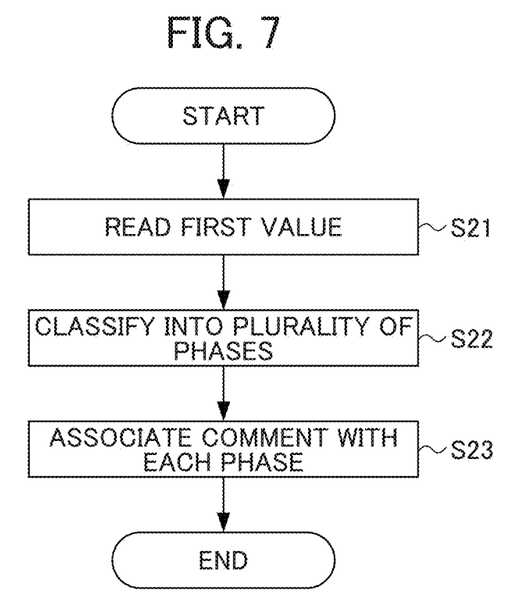
FIG. 7 is a flowchart showing classification processing according to the embodiment of the present invention.

FIG. 7 is a flowchart showing classification processing in the alert analyzing apparatus 1 according to the present embodiment.

The present processing is executed at predetermined timing, such as in a periodic manner or when the number of stored comments reaches a predetermined number.

In Step S21, the control unit 10 reads the first value and the comment stored in the storage unit 20.

In Step S22, based on chronological fluctuation rates of the first value that was read in Step S21, the control unit 10 (the classification unit 14) classifies the time zones including the first value into any one of the plurality of segments such as the rising trend phase, the sharply rising phase, the falling trend phase, and the sharply falling phase.

In Step S23, the control unit 10 (the classification unit 14) associates each of the segments classified in Step S22 with a comment corresponding to the time zone, and stores them into the storage unit 20.

As described above, according to the present embodiment, the alert analyzing apparatus 1 can accept a comment on each alert, and classify the comment thus accepted, based on each fluctuation phase of the first value in terms of the actual value and the target value. Therefore, since the alert analyzing apparatus 1 can output comments classified into each segment in response to a request from the user, the manager's know-how that is input as comments on individual alerts can be efficiently provided for later analyses.

More specifically, the alert analyzing apparatus 1 can provide a comment that is input for an alert for traffic, staff or cost, based on divergence between the first value and the second value (the predicted value and the actual value), the comment being classified into each fluctuation phase of the first value (the actual value). Therefore, the user of the alert analyzing apparatus 1 can efficiently refer to such comments at a contact center, and utilize the comments for improving the accuracy of the second value (the predicted value) in a similar phase, and analyzing a cause of, or providing a countermeasure against, an alert in a similar phase.

At this time, since the alert analyzing apparatus 1 accepts a comment including a cause of, or countermeasure against, an alert, the manager's know-how regarding individual alerts can be utilized for improving the accuracy of the predicted value in a similar phase, and analyzing a cause of, or providing a countermeasure against, divergence between the predicted value and the actual value in a similar phase.

For example, in a case in which the accuracy of predicting a rising trend phase or a sharply rising phase of traffic is low, a difference analysis is facilitated in accordance with a causative event, such as for a case of a printed advertisement in which a single peak occurs, and a case of an Internet advertising in which a plurality of peaks consecutively occur. Depending on a causative event, an analysis of difference is facilitated for timing of transitioning from a certain phase to a next phase, or an increasing/decreasing rate of an actual value, etc.

Since the alert analyzing apparatus 1 displays fluctuation of the first value (the actual value) in a graphic chart, and also displays an alert and a comment in association with the graphic chart, the user of the alert analyzing apparatus 1 can efficiently refer to and utilize the alert and the comment corresponding to each fluctuation phase of the first value.

At this time, the alert analyzing apparatus 1 determines a manner of displaying the alert and the comment in accordance with an amount of divergence between the first value and the second value (the predicted value and the actual value), and therefore can indicate importance of the alert by, for example, changing an icon color or a display font for the alert.

Based on characteristics of fluctuation of the first value, the alert analyzing apparatus 1 can classify the corresponding alerts and comments through classification of the time zones into: the rising trend phase in which the first value rises gently; the sharply rising phase in which the first value rises sharply; the falling trend phase in which the first value falls gently; and the sharply falling phase in which the first value falls sharply.

At this time, the alert analyzing apparatus 1 classifies time zones by segmenting the characteristics of fluctuation, based on an amount of fluctuation of the first value per elapsed time period, and therefore can classify and provide alerts and comments automatically not manually.

Although the embodiment of the present invention has been described above, the present invention is not limited to the aforementioned embodiment. The effects described in the embodiment merely list the most preferable effects that arise from the present invention, and the effects according to the present invention are not limited to those described in the embodiment.

The alert analyzing apparatus 1 may be any of various information processing apparatuses (computers) such as a server device or a personal computer (PC), and each of the aforementioned functions is implemented by software. In a case in which a function is implemented by software, a program composing the software is installed in an information processing apparatus. Such a program may be distributed by being recorded in a removable medium such as a CD-ROM, and may be distributed by being downloaded to an information processing apparatus through a network.

The functions of the alert analyzing apparatus 1 may be decentralized in a plurality of information processing apparatuses. In response to a request from a user's terminal connected through a network, an input-output function may be provided to the terminal through communication. In this case, comments are input from the terminal, and are transmitted to the alert analyzing apparatus 1, and results of various processing of alerts and comments are transmitted and output from the alert analyzing apparatus 1 to the terminal.

What is claimed is:

1. An alert analyzing apparatus, comprising:
   a storage unit that stores a first value and a preset second value in association with time-of-day information, the first value fluctuating as time elapses;
   an alert output unit that outputs an alert and time-of-day information in a case in which the first value diverges from the second value in a certain time of day;
   a comment accepting unit that accepts an input of a comment on the alert that is output from the alert output unit, and stores the comment in association with the time-of-day information; and
   a classification unit that classifies a plurality of time zones into any one of predetermined segments, and stores the comment associated with the time zone thus classified, in association with each of the segments, based on a fluctuation phase of the first value.

2. The alert analyzing apparatus according to claim 1, wherein the first value and the second value include at least any one of traffic, a number of operators, or cost, at a contact center.

3. The alert analyzing apparatus according to claim 1, wherein the comment accepting unit accepts an input of a comment including a cause of, or a countermeasure against, divergence between the first value and the second value.

4. The alert analyzing apparatus according to claim 1, further comprising:
   a graphic chart display unit that displays a graphic chart showing how the first value fluctuates as time elapses; and
   an alert display unit that displays the alert and the comment in association with the graphic chart.

5. The alert analyzing apparatus according to claim 4, wherein the alert display unit determines a manner of displaying the alert and the comment, in accordance with an amount of divergence between the first value and the second value.

6. The alert analyzing apparatus according to claim 1, wherein the segments include at least a rising trend phase, a sharply rising phase, a falling trend phase, and a sharply falling phase.

7. The alert analyzing apparatus according to claim 1, wherein the classification unit determines a segment to classify the time zones into, based on an amount of fluctuation of the first value per elapsed time period.

8. An alert analyzing method, causing a computer to execute:
   a storing step of storing a first value and a preset second value in association with time-of-day information, the first value fluctuating as time elapses;
   an alert outputting step of outputting an alert and time-of-day information in a case in which the first value diverges from the second value in a certain time of day;
   a comment accepting step of accepting an input of a comment on the alert that is output in the alert outputting step, and storing the comment in association with the time-of-day information; and
   a classifying step of classifying a plurality of time zones into any one of predetermined segments, and storing the comment associated with the time zone thus classified, in association with each of the segments, based on a fluctuation phase of the first value.

9. A non-transitory computer-readable medium storing an alert analyzing program for causing a computer to execute:
   a storing step of storing a first value and a preset second value in association with time-of-day information, the first value fluctuating as time elapses;
   an alert outputting step of outputting an alert and time-of-day information in a case in which the first value diverges from the second value in a certain time of day;
   a comment accepting step of accepting an input of a comment on the alert that is output in the alert outputting step, and storing the comment in association with the time-of-day information; and
   a classifying step of classifying a plurality of time zones into any one of predetermined segments, and storing the comment associated with the time zone thus classified, in association with each of the segments, based on a fluctuation phase of the first value.

* * * * *